United States Patent
Liege et al.

(10) Patent No.: US 9,438,829 B2
(45) Date of Patent: Sep. 6, 2016

(54) DEVICE FOR PICTURE TAKING IN LOW LIGHT AND CONNECTABLE TO A MOBILE TELEPHONE TYPE DEVICE

(71) Applicant: DXO LABS, Boulogne Billancourt (FR)

(72) Inventors: Bruno Liege, Boulogne Billancourt (FR); Frédéric Guichard, Paris (FR); Hoang-Phi Nguyen, Paris (FR); Imène Tarchouna, Gentilly (FR); Stéphane Laveau, Paris (FR); Wolf Hauser, Meudon (FR)

(73) Assignee: DXO LABS, Boulogne-Billancour (FR)

( * ) Notice: Subject to any disclaimer, the term of this patent is extended or adjusted under 35 U.S.C. 154(b) by 0 days.

(21) Appl. No.: 14/909,115

(22) PCT Filed: Jul. 30, 2014

(86) PCT No.: PCT/EP2014/066346
§ 371 (c)(1),
(2) Date: Jan. 30, 2016

(87) PCT Pub. No.: WO2015/014880
PCT Pub. Date: Feb. 5, 2015

(65) Prior Publication Data
US 2016/0165156 A1    Jun. 9, 2016

(30) Foreign Application Priority Data

Jul. 31, 2013  (FR) ...................................... 13 57575

(51) Int. Cl.
*H04N 5/225* (2006.01)
*H04N 5/357* (2011.01)
*H04N 5/235* (2006.01)
*H04N 5/232* (2006.01)

(52) U.S. Cl.
CPC ............ *H04N 5/357* (2013.01); *H04N 5/2253* (2013.01); *H04N 5/2254* (2013.01); *H04N 5/2256* (2013.01); *H04N 5/2353* (2013.01); *H04N 5/23293* (2013.01)

(58) Field of Classification Search
None
See application file for complete search history.

(56) References Cited

U.S. PATENT DOCUMENTS

2005/0174434 A1  8/2005  Chang et al.
2006/0152576 A1  7/2006  Kiessling et al.

FOREIGN PATENT DOCUMENTS

DE  10 2009 032622 A1  1/2011
JP  2001 245034 A  9/2001
KR  2003 0061980 A  7/2003

*Primary Examiner* — Roberto Velez
*Assistant Examiner* — Stephen Coleman
(74) *Attorney, Agent, or Firm* — IM IP Law PLLC; C. Andrew Im

(57) ABSTRACT

A picture taking device includes a sensor of resolution higher than thirteen megapixels and an objective lens open at minimum to f/2.0 for at least one focal length value. A diagonal dimension of the photosensitive surface of the sensor is greater than 15 mm. A digital processor to reduce noise while preserving the textures in at least one image captured by the sensor. The device has a power supply and a rigid connector to connect it to the mobile phone or tablet type device comprising a screen, and communicates and/or commands with the mobile phone or tablet type device. A picture taking method is provided using the picture taking device.

20 Claims, 11 Drawing Sheets

DEVICE FOR PICTURE TAKING IN LOW LIGHT AND CONNECTABLE TO A MOBILE TELEPHONE TYPE DEVICE

RELATED APPLICATIONS

This application is a §371 application from PCT/EP2014/066346 filed Jul. 30, 2014, which claims priority from French Patent Application No. 13 57575 filed Jul. 31, 2013, each of which is herein incorporated by reference in its entirety.

FIELD OF THE INVENTION

The present invention relates to the field of electronics and photography.

The present invention relates more specifically to a picture taking device which can be connected to a mobile phone or to a digital tablet.

In the remainder of the document, the term "tablet" will be used to denote a digital tablet comprising a processor and a touchscreen. An example of such a tablet is an IPAD® (registered trademark of Apple Inc.) marketed by the Apple Inc., or alternatively the SAMSUNG GALAXY TAB® 2 (registered trademark of Samsung Electronics Co., Ltd.) marketed by the Samsung Electronics Co., Ltd.

The device according to the present invention has a picture taking quality equal to the quality of reflex or D-SLR (Digital Single Lens Reflex) type cameras, particularly in low lighting or very low lighting situations. The device according to the present invention is very compact (it fits into a pocket of a garment so that it is always readily available) and is lightweight. The device according to the invention can be attached by a rigid connector to a mobile phone or to a tablet so as to use the screen thereof by using one or two hands to hold the combination of the phone or tablet and the device according to the present invention. It also offers additional features, such as a large depth of field for example.

BACKGROUND OF THE INVENTION

The capture of well exposed images (elements with reflectance at 18% of the scene reaching the middle of the dynamic range in the captured visible image) in very low lighting situations in theory requires the use either of an additional source of light of the flash type, which changes the ambiance of the scene, or of photographic equipment equipped with a highly sensitive sensor and with a wide aperture objective lens so as to capture the maximum amount of light which is too bulky to fit into a pocket of a garment.

In both instances, this is supposed to allow the use of an exposure time that is short enough that it limits the movement blur in the image. The generally accepted rule for defining the maximum exposure time T that can be used as a function of the 35 mm equivalent focal length value f is $T=1/f$ (Xiao, F. Pincenti J., John G. and Johnson K., "Camera motion and mobile imaging", Proceeding of Electronic Imaging (2007)).

The 35 mm equivalent focal length value currently considered as a reference for fixed focus equipment is between 28 mm and 35 mm. The maximum useable exposure time is therefore between $1/28$ s and $1/35$ s.

The use of an additional source of light is usually unwelcome because it changes the low-lighting atmosphere of the scene and therefore does not allow the scene being experienced by the individual taking the photo to be recreated.

Photographic equipment equipped with a highly sensitive sensor and with a wide aperture objective lens generally means a reflex camera with interchangeable objective lens.

This type of equipment makes it possible to obtain very high quality images with low noise (high signal to noise ratio (SNR)), a high level of sharpness and texture (high SFR (spatial frequency response) edge and SFR texture values) and a very broad dynamic range.

The noise as used in calculating the SNR can be characterized as measured from the "visual noise" described in D. Baxter, F. Cao, H. Eliasson, J. Phillips. Development of I3A CPIQ spatial metrics. SPIE Conference on Electronic Imaging 2012. This evaluation of the noise allows the variations in luminance and in chrominance in the image to be taken into consideration simultaneously.

The SFR edge and the SFR texture are two measurements of sharpness and of texture. These two measurements are described in the same document under the headings "Edge acutance" and "Texture blur" respectively.

Nevertheless, this type of equipment is heavy and cumbersome, which means that it is not always possible to have it about one's person under all circumstances.

Moreover, the use of a very wide aperture combined with the use of a large sized sensor results in a reduced depth of field, something which on the one hand makes focusing more difficult and on the other hand reduces the number of sharp elements in the image.

Photographic equipment of the reflex camera or DSLR camera type is known in the prior art. This type of equipment has the disadvantage of being bulky and heavy. DSLR cameras make it possible to obtain an excellent quality of image (very good SNR, and very good texture levels) because of the large size of their sensor (diagonals greater than or equal to 22 mm) and the possibility of fitting them with objective lenses with apertures to f/2.0 or better. However, their bulk and weight do not allow them always to be carried about one's person. Furthermore, for most people, their cost is prohibitive.

Photographic equipment incorporated into mobile phones or tablets is also known in the prior art. Most mobile phones or tablets currently on sale now incorporate an image and video capture system. Because of their use, mobile phones or tablets are not very bulky, meaning that they can be carried around everywhere in a pocket of a garment or of a bag. However, because of their compactness, the inbuilt camera also needs to be small in size. The sensor is therefore small in size, its diagonal generally being less than 7 mm, and the optical system is small also, the aperture thereof being at most f/2.0. The small size of the sensor means low sensitivity but a greater depth of field, all of this in comparison with a reflex or DSLR camera. Because the optical system needs to be small in size, its aperture will be small. The camera built into the phone or the tablet will therefore be all the less able satisfactorily to record very low lighting scenes. The exposure time seen with this equipment is of the order of $1/15$ s under these conditions. This is longer than the maximum time defined hereinabove that will allow a photo to be taken without movement blur. By default, in low lighting situations, the phone or the tablet will therefore have a tendency to use a flash in order to capture an image without movement blur. In the case of high resolution video recording (HD 1080p video format or better), this $1/15$ s exposure time is not compatible with a refresh rate of at least 24 images per second.

Devices of the clip-on camera type are also known from the prior art. Before mobile phones were almost systematically fitted with cameras, some manufacturers offered external camera modules to be connected to the phone. These modules incorporated an optical view finder, a VGA camera and a flash. They allowed the camera functionality to be added to the phone but did not allow pictures to be taken with very high resolution under low lighting conditions.

Devices of the action camera type, such as for example the devices marketed by GOPRO® (registered trademark of Gopro, Inc.), are also known from the prior art. These devices are not intended to be carried around everywhere as they are and are not intended to be connected rigidly to a phone or a tablet. Devices of the action camera type are devices intended chiefly for making videos in so-called sports environments. They are designed to be used with a casing. They are not optimized for capturing stationary images in high resolution under low lighting conditions. They are designed to operate remote from their control screen.

Devices of the surveillance camera type connected to a phone or to a tablet via a wireless device are also known in the prior art. These devices are intended to be left at a fixed location, the phone or the tablet being used only for remote monitoring. As they are not physically attached to the phone or to the tablet, they cannot be used hand-held.

Picture taking systems using matrix cameras are also known in the prior art. By way of example, mention may be made of the systems marketed by the following companies: Lytro, Pelican, Raytrix and Toshiba. These systems have significant disadvantages. For example, the Lytro systems have a low-resolution output (1 MP or megapixel) and require post-capture processing in order to obtain a final image. The Pelican systems have a plurality of (sixteen) low-resolution monochrome sensors. The Raytrix ones are very bulky and need to be connected to a computer. They have a moderate resolution (3 megapixels), very high cost and are not widely available to the public. Finally, the Toshiba systems are mainly designed for detecting distance (3D estimation) and are not designed to output high-resolution images.

SUMMARY OF THE INVENTION

The problem addressed by the present invention is therefore that of creating a picture taking device which under very low lighting conditions provides a high resolution (13 Mpix or more) visible image, an image quality similar to or better than that obtained through the use of interchangeable objective lens reflex (D-SLR) cameras, while at the same time being small in bulk and weight, allowing it for example to fit into a pocket (of a garment or of a bag). The device also provides, under very low lighting conditions, video of high resolution (HD 1080p video format or superior) with a refresh rate greater than or equal to 30 images per second and with an image quality similar to or better than that obtained through the use of interchangeable objective lens reflex (D-SLR) cameras, while at the same time being smaller in bulk and in weight.

Within the meaning of the present invention, a low-lighting environment is understood to be scene lighting of below 10 lux.

Within the meaning of the present invention, a raw image is the name given to an image derived from a sensor prior to the demosaicing operation and prior to the application of a color matrix and tone curve. A raw image is made up of pixels of different colors and may be in the Bayer format (for example green and red pixels alternating on the even-numbered rows, with blue and green pixels alternating on the odd-numbered rows) or some other format (for example other combinations of white and/or green and/or red and/or blue pixels). In one alternative form, a raw image is made up of several, notably four, raw images taken consecutively, or a video sequence made up of a series of raw images.

Within the meaning of the invention, a visible image is the name given to a color image (using the YUV, RGB or other coding standard, which may or may not be compressed). A visible image is obtained by the digital processing of a raw image and comprises, at minimum, the operations of demosaicing and application of a color matrix and tone curve.

The digital processing of a raw image in order to obtain a visible image generally involves all or some of the following steps:
blackening
correction of defective pixels
calculation of statistics and estimation of exposure, white balance and autofocus
correction of the vignetting and colored vignetting
correction of white balance
reduction of noise by spatial filtering on a raw image
reduction of noise by temporal filtering on raw images
demosaicing
color matrix
tone curve
YUV matrix
sharpness filter
colored fringe reduction filter
reduction of noise by spatial filtering on a visible image
reduction of noise by temporal filtering on visible images
increase of dynamic range by compositing differently exposed images
increase of contrast by local contrast algorithm (local tone mapping).

These steps are known to those skilled in the art and notably described in Robert D. Fiete, "*Modeling the Imaging Chain of Digital Cameras*", SPIE Tutorial Text Vol. TT92.

There is a desire to create a device which has a dynamic range of at least 12 Ev, namely which is at least the equal to that of D-SLR devices.

One of the objects of the present invention is also to create a picture taking device which also by default has a deep depth of field thanks to the use of image processing that makes it possible to reduce the size of the sensor and thus increase the depth of field for a given aperture, a given captured-scene illumination and a given image quality.

The following parameters have been taken into consideration when designing the device according to the present invention:
L: quantity of light needed to illuminate the scene;
D: dimensions; and
C: cost.

In the context of the present invention, the desire is to maximize parameter L and to minimize parameters D and C.

To this end, in its widest accepted sense, the present invention relates to a picture taking device, characterized in that it comprises a sensor of resolution higher than thirteen megapixels, a diagonal of the photosensitive surface of the sensor greater than 15 mm, in that it comprises an objective lens open at minimum to f/2.0 for at least one focal length value, in that it has digital processing means for reducing noise while preserving the textures in at least one image captured by said sensor, in that it is able to be connected by a rigid connector to a device of the mobile phone or tablet type comprising a screen, in that it has its own power supply means, and in that it has dimensions meeting the following criteria: when the picture taking device is not connected to a device of the mobile phone or tablet type, the maximum of the height, of the width and of the depth of the smallest rectangular parallelepiped inside which the device can be inscribed is less than 70 mm, the minimum of these same height, width and depth being less than 30 mm, the volume of said device being less than 86 000 mm³, and in that it comprises means for communicating images and/or commands with said device of the mobile phone or tablet type.

Thus, the picture taking device according to the present invention has a high image quality under low lighting conditions: on the captured subject, with a mean exposure in the final dynamic range, and with details and textures preserved and a low noise level.

Because of its higher aperture objective lens and its sensor which is more sensitive than the objective lens and the sensor of said device of the mobile phone or tablet type, and on account of the onboard image processing, the picture taking device has light sensitivity that is superior to that of said device of the mobile phone or tablet type.

Advantageously, the device comprises means implemented autonomously and/or in combination with means incorporated into said mobile phone or said tablet which in order to produce a visible image of at least thirteen megapixels, is exposed in such a way as to have elements of which the reflectance is 18% in the scene to be captured which reach the middle of the dynamic range in the visible image with an SNR (signal to noise ratio) midway through the dynamic range equal to or greater than 34 dB, SFR edge and SFR texture values which differ by less than 10% and which, at one quarter of the Nyquist frequency, are less than or equal to 120% and which, at half the Nyquist frequency, are greater than or equal to 50%, from a capture of images for exposure times of ⅟₃₀ s or less of a scene illuminated with light at a lighting level less than or equal to 10 lux.

These means allow the device according to the present invention to record a high resolution video (in the HD 1080p video format or superior) with a refresh rate greater than or equal to thirty images per second for a scene illuminated with ten lux or less, in which video each frame is exposed in such a way as to have elements of which the reflectance is 18% in the scene that is to be recorded which reach half the dynamic range in the video recording, with an SNR midway through the dynamic range of 34 dB or better, SFR edge and SFR texture values which differ by less than 10% and which, at one quarter of the Nyquist frequency, are less than or equal to 120% and which, at half the Nyquist frequency, are greater than or equal to 50%.

For preference, the picture taking device has no screen to allow the previewing or post-viewing of an image.

The absence of a screen means that the size and cost of the device can be kept down.

According to one embodiment, said means for communicating images and/or commands with said device of the mobile phone or tablet type allow an image taken by said picture taking device to be previewed on the screen of said device of the mobile phone or tablet type.

Advantageously, said means for communicating images and/or commands with said device of the mobile phone or tablet type allow said picture taking device to be controlled using the screen of said device of mobile phone or tablet type.

For preference, said means for communicating images and/or commands with said device of mobile phone or tablet type allow parameters of said picture taking device to be set using the screen of said device of mobile phone or tablet type.

For preference, said digital processing means for reducing noise while preserving the textures use a temporal merger of N images, N being a natural integer greater than or equal to two.

According to one embodiment, said digital processing means for reducing noise while preserving the textures are hosted remotely on the device of mobile phone or tablet type.

According to one alternative form, said device further comprises means for recording raw images in addition to or in place of the recording of the visible images after digital processing operations have been performed.

According to one embodiment, said rigid connector of said picture taking device is positioned in a hinge allowing its orientation relative to said device to change.

For preference, said picture taking device comprises image processing means allowing digital image stabilization.

According to one alternative form, said picture taking device employs an autofocus function to maximize the sharpness of the subject being photographed and/or filmed.

According to one embodiment, the autofocus function operates continuously so as to keep the subject of interest permanently in focus.

This makes it possible to reduce the latency during the taking of the picture.

According to one embodiment, said device has a button to start the recording.

The button is used to start the taking of the picture or initiate the start of the video recording.

According to one embodiment, the axis along which the button to start the recording is pressed is situated in the plane containing the axis of the rigid connector and the points of the device that are used for holding same.

According to one embodiment, it is made up of two parts sliding one on the other so as to obtain an open position and a closed position, said closed position allowing the connector and/or said button to start the recording to be protected, and said open position allowing access to the connector and/or to said button to start the recording.

According to one embodiment, said button to start the recording has two modes of operation: partially depressed and fully depressed.

The partially depressed mode makes it possible for example to lock the exposure and/or white balance and/or focusing parameters onto the current values. It may also allow toggling from a low-consumption preview mode in which the image is undersampled to a full-resolution image acquisition mode allowing noise reduction digital processing to be carried out while at the same time preserving the textures using a temporal merger of N images, N being a natural integer greater than or equal to 2.

Advantageously, said connector is protected by a removable cap.

According to one embodiment, said device comprises means for transmitting at least one raw image to said device of mobile phone or tablet type in at least one mode of operation.

The present invention also relates to a picture taking method using the picture taking device described above, comprising a step of capturing at ⅟₃₀ s or under a scene comprising lighting of 10 lux or below, and a step of producing a visible image of a quality higher than thirteen megapixels, said image being exposed in such a way as to have elements of which the reflectance is 18% in the scene that is to be captured which reach the middle of the dynamic range, with an SNR midway through the dynamic range of 35.5 dB or higher, SFR edge and SFR texture values which differ by less than 10% and which, at a quarter of the Nyquist frequency, are less than or equal to 120% and which, at half the Nyquist frequency, are greater than or equal to 50%.

BRIEF DESCRIPTION OF THE DRAWINGS

The invention will be better understood with the aid of the description, given hereinafter purely by way of explanation, of one embodiment of the invention, with reference to the figures in which.

DETAILED DESCRIPTION OF THE EMBODIMENTS OF THE INVENTION

Figure 1:
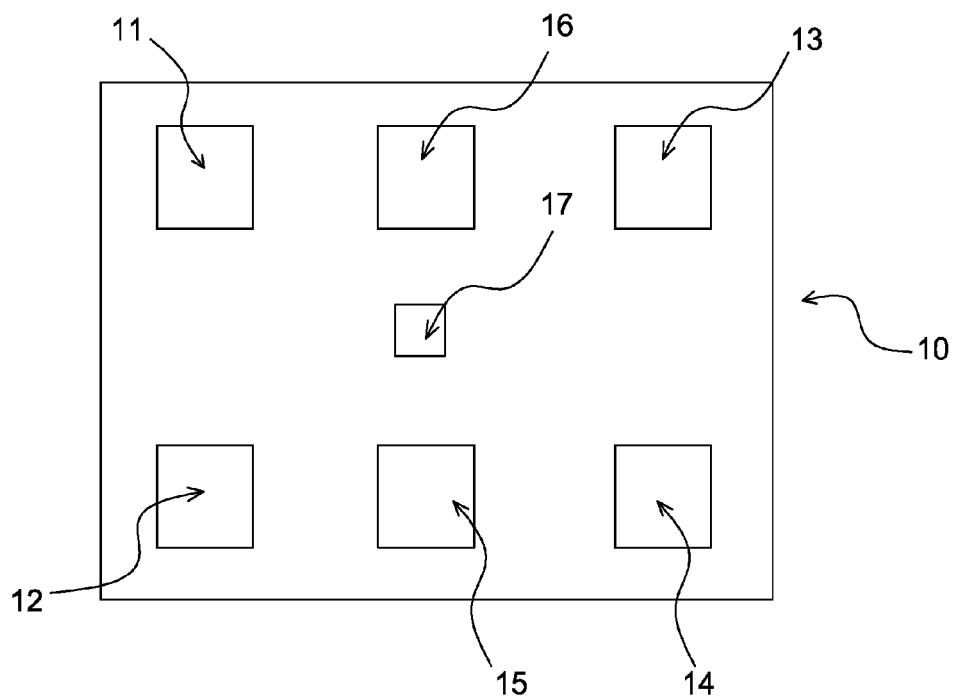
FIG. 1 illustrates the picture taking device according to the present invention, in an embodiment.

FIG. 1 illustrates the picture taking device 10 according to the present invention, in one embodiment.

This device comprises a sensor 11 with resolution higher than thirteen megapixels, a diagonal of the photosensitive surface of the sensor greater than 15 mm, is able to be connected by a rigid connector 15 to a device 20 of the mobile phone or tablet type comprising a screen 21. The picture taking device 10 according to the present invention furthermore has its own power supply means 12, and comprises means 13 for communicating images and/or commands to said device 20 of mobile phone or tablet type. Finally, the picture taking device 10 according to the present invention has an objective lens 16 open at minimum to f/2.0 for at least one focal length value.

According to one embodiment, said objective lens of said device 10 has a fixed focal length.

Advantageously, the focal length allows at least the same field coverage as a 35 mm focal length on a 24×36 sensor. For a sensor with a diagonal measurement of 15 mm, that corresponds to a focal length of 12 mm.

According to another embodiment, said objective lens of said device 10 is a zoom lens the shortest focal length of which is 12 mm or less and which is open at minimum of f/2.0 for this focal length.

FIG. 1 also illustrates the fact that the picture taking device 10 according to the present invention comprises digital processing means 14 for reducing the noise while preserving the textures.

The digital processing means for reducing the noise while preserving the textures may be of the non-local mean calculation type as described in A. Buades, B. Coll and J. Morel (2005b), 'A review of image denoising algorithms, with a new one', Multiscale Model. Simul. 4, 490-530 or in A. Buades, B. Coll and J. Morel (2008b), 'Nonlocal image and movie denoising', Internat. J. Computer Vision 76, 123-139 or of the "block-matching 3D" calculation type as described in K. Dabov, A. Foi, V. Katkovnik and K. Egiazarian (2007), 'Image denoising by sparse 3D transform-domain collaborative filtering', IEEE Trans. Image Processing 16, 2080-2095 or in K. Dabov, A. Foi, V. Katkovnik and K. Egiazarian (2009), BM3D image denoising with shape-adaptive principal component analysis. In Proc. Workshop on Signal Processing With Adaptive Sparse Structured Representations: SPARS 09, volume 49.

The digital processing means for reducing noise while preserving the textures may incorporate a temporal merger of N images, N being a natural integer greater than or equal to two, which temporal merger is as described in Y. S. Moon, S. H. Lee, "*A new fusion-based low light still-shot stabilization*", Conference on Multimedia Content and Mobile Devices, Electronic Imaging 2013. The merger of N images allows a gain $\sqrt{N}$ in stops. 3 dB is gained in SNR for each stop gained. Thus, according to an embodiment using a temporal merger of N=4 images and a sensor with a sensitive surface diagonal measurement of 16 mm provides a gain of 6 dB, making it possible to reduce the size of the device according to the invention. Indeed, the sensitivity is then the equivalent of that of a sensor with a diagonal measurement of around 32 mm (namely a sensor and an objective lens which are 2 times larger in the x and y dimensions) which would need an objective lens with a focal length 2 times longer in order to obtain the same field (namely 2 times greater in the z direction): in order to obtain the same performance under low light, the optical module (sensor+ objective lens) would be bulkier by a factor of around 8 (approximately 128 cm$^3$ rather than 16 cm$^3$) for the same sensitivity, and would not allow the device to fit in a pocket.

Advantageously, the temporal merger uses what is known as an "antighost" mechanism that makes it possible to discriminate between the images elements which are different and thus avoid merging them. The temporal merger may be performed on the images before demosaicing or after demosaicing.

According to one embodiment, any image (picture or individual frame of the video recording) output by the device 10 is the resultant of the merger of the N images by the image processing means 14.

According to one embodiment, said digital processing means for reducing the noise while preserving the textures are hosted remotely at least in part on the device of mobile phone or tablet type. In this embodiment, the preview digital processing (display of video prior to the picture taking for view finding) and the digital processing of the video for the video recording is performed in the device. In this embodiment, the still image processing is performed as follows. For preference, one or more successive raw images are transferred to the mobile phone or tablet which converts the raw image into a visible image involving noise reduction processing, for example temporal merger of several images and/or spatial noise reduction with the preservation of texture.

As an alternative, a preprocessing operation is performed in the device, for example a conversion of raw image to visible image of at least two images, and a post-processing operation of reducing the noise is performed in the phone or the tablet, for example a temporal merger of several images and/or a spatial denoising with the preservation of texture.

As an alternative, one or more successive raw or visible images are transferred to a personal computer or server which carries out a noise reduction processing operation and the conversion of the raw image to the visible image where appropriate.

The noise reduction processing may be carried out automatically with parameters that are predetermined as a function of the sensor gain, or that take account of user settings (denoising level, white balance, contrast, etc).

The processing in the phone or in the tablet may be carried out by software on the main processor and/or by software on the graphic processor and/or by using a component comprising wired or programmable calculation means suited to image processing.

In an alternative form, said device allows the raw images to be recorded in addition to or in place of the recording of the visible images that have undergone digital processing. The user of the device will then be able to apply the digital processing of his choice to the recorded raw images. He will for example be able to apply a merger involving more images than that applied in the device.

The figures also illustrate the fact that, in one embodiment, the picture taking device 10 according to the present invention comprises a button 17 to start the recording.

Figure 12:
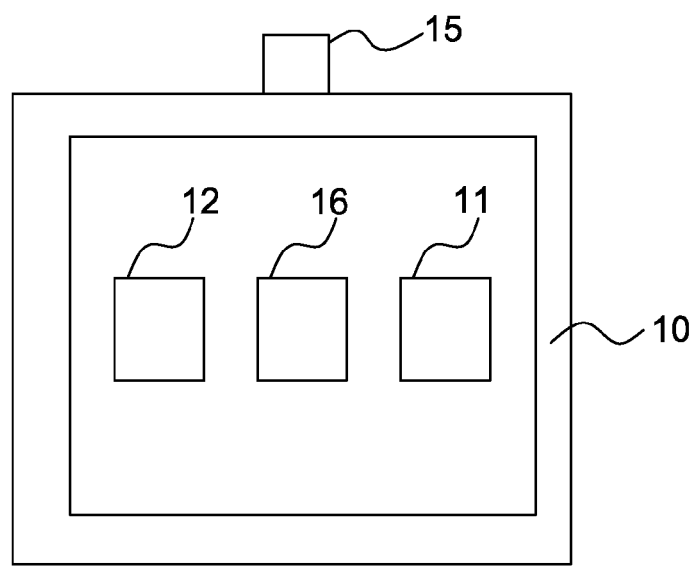
FIG. 12 depicts an exploded view of one embodiment of the picture taking device according to the present invention comprising an objective lens, a sensor in a camera module 25×25×25 mm, a printed circuit containing the digital processing, a battery and a connector.

The picture taking device 10 according to the present invention has dimensions meeting the following criteria: the maximum of the height, of the width and of the depth of the smallest rectangular parallelepiped inside which said device 10 can be inscribed must be less than 70 mm, the minimum of these same height, width and depth must be less than 30 mm, the volume of the device is less than 86 000 mm$^3$. Thus, it easily fits into the pocket of a bag or of a garment. This allows the user always to have about his person a picture taking device of digital reflex camera quality allowing pictures to be taken under very low lighting conditions, which can be used in particular for indoor photographs or moving scenes, notably of children. It is possible within this volume and with these dimensions, for example as depicted in FIG. 12, to house a sensor with sensitive surface diagonal of 16 mm, an objective lens open to f/2.0 the 35 mm equivalent focal length of which is 28 mm (approximately 8 cm$^3$ for the optic module combining the sensor and the objective lens), electronics comprising digital processing means that reduce noise while preserving the textures and communication means according to the invention (approximately 10 cm$^3$ for the electronics), a battery (approximately 15 cm$^3$ for 5 Wh using lithium-polymer technology), a rigid connector (approximately 1 cm$^3$ with the hinge device) and mechanics (approximately 10 cm$^3$).

Figure 2A:
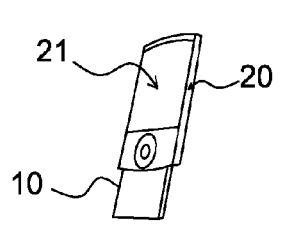
FIG. 2A depicts the picture taking device according to the present invention connected to a device of mobile phone type, in one embodiment.
Figure 2B:
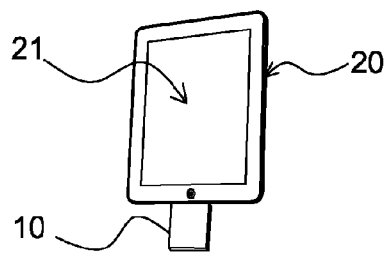
FIG. 2B depicts the picture taking device according to the present invention connected to a device of digital tablet type, in one embodiment.

FIG. 2A depicts the picture taking device 10 according to the present invention connected to a device 20 of the mobile phone type, in one embodiment. FIG. 2B depicts the picture taking device 10 according to the present invention connected to a device 20 of the digital tablet type, in one embodiment. This device 20 of the mobile phone or tablet type comprises a screen 21. The picture taking device 10 according to the present invention according to the present invention is connected rigidly to said device 20 of the mobile phone or tablet type: this is not a connection using a flexible cable but rather a wireless connection of the Bluetooth, Wi-Fi or NFC type.

The rigid connection may adopt a number of forms:
- a fixed connector fixed to the device according to the invention and that plugs into the corresponding connector belonging to the phone or tablet, and/or
- a fixed connector fixed to the device according to the invention and able to rotate so that the camera can be aimed in an adjustable direction by the user and that plugs into the corresponding connector belonging to the phone or to the tablet, and/or
- a mechanical attachment for example using clips
- it being possible for the connector to be a USB, micro USB, lightning or some other form of connector
- the connector allowing images to pass to the phone or the tablet during the previewing phase (display of video before the taking of pictures allowing view finding), and/or during the video recording and/or after still images have been captured, and/or allowing commands to pass from the phone or from the tablet to the device according to the invention.

The rigid connection 15 allows the picture taking device 10/device 20 of the mobile phone or tablet type assembly to be held in one hand, holding the device 20 of the mobile phone or tablet type. The rigid connection allows the picture taking device 10 and device 20 of the mobile phone or tablet type to be held in two hands: one hand to hold the device 20 of mobile phone or tablet type and one hand to press the picture taking button 17 of the picture taking device 10. Without this rigid connection, it would be very difficult to view find and take pictures using the camera in one hand and the phone or tablet in the other.

Figure 13:
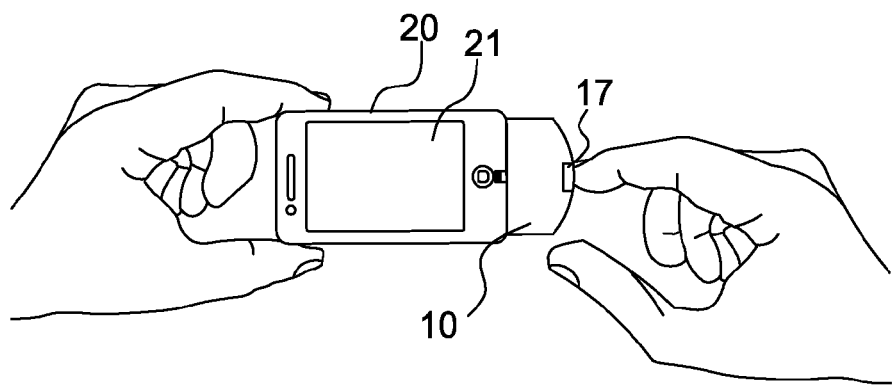
FIG. 13 illustrates the picture taking device according to the present invention in one embodiment, being held by a person in their hand.

FIG. 13 illustrates the picture taking device according to the present invention in this embodiment, held by a person in their hand.

The rigid connection allows the device according to the invention and the phone or tablet to be secured together mechanically and also allows the passage of the electrical signals required for:
- transmitting images from the device according to the invention to the phone or tablet for previewing the images on the screen of the phone or of the tablet, it being possible for these images to be compressed and decompressed on the fly so as to reduce the bit rate to a format compatible with the phone or with the tablet, for example H264 or H265/CHVC or the like, and/or
- transmitting commands and/or controls from the phone or the tablet to the device according to the invention, notably:
  - command to take a picture: taking a still image, starting/stopping a video recording,
  - choice of resolution,
  - choice of exposure: aperture, exposure time, sensitivity of the sensor, mode (priority on aperature, priority on exposure time, priority on sensitivity, manual, automatic, etc.)
  - setting of the white balance,
  - autofocus settings (deactivation, choice of area of interest, etc.),
  - image stabilization settings,
  - choice of the type of scene: automatic, landscape, portrait, etc.,
  - other camera settings, and/or
- transmitting commands and/or controls from the device according to the invention to the phone or the tablet, notably:
  - command to take a picture or other commands situated on the device according to the invention and able to influence the application of to the mobile phone or the tablet
  - data regarding the scene and calculated by the device according to the invention and/or by the mobile phone or by the tablet from statistics about the image which are supplied by the device according to the invention to the mobile phone or to the tablet, for example: illuminant determined by the white balance, exposure (exposure time, sensitivity, gain), underexposure alert, movement alert, presence and position of faces, type of scene, etc.

According to one embodiment, the means 13 for communicating images and/or commands to said device 20 of the mobile phone or tablet type allow an image taken by said picture taking device 10 to be previewed on the screen 21 of said device 20 of mobile phone or tablet type. Thus, the user can enjoy the benefit of a large screen, even though the device according to the invention is small in size without a large screen and can fit into a pocket.

Figure 18:
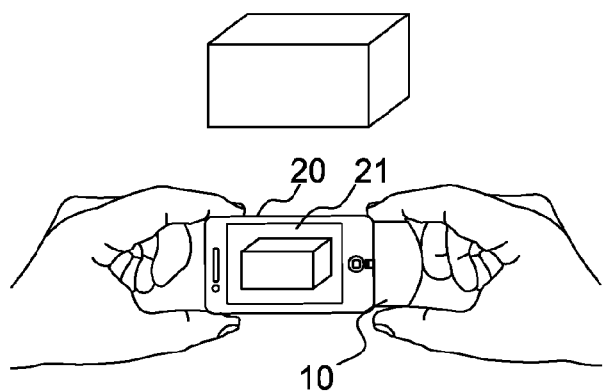
FIG. 18 depicts a previewing of the scene on the screen of the device of mobile phone type.

FIG. 18 depicts a preview of the scene on the screen of the device of mobile phone type.

In one embodiment, these means 13 allow said picture taking device 10 to be controlled via the screen 21 of said device 20 of the mobile phone or tablet type. Thus, the user may enjoy the benefit of numerous commands and settings, even though the device according to the invention is small in size with a small number of buttons and can fit into a pocket.

In one embodiment, these means 13 allow parameters of said picture taking device 10 to be set using the screen 21 of said device 20 of the mobile phone or tablet type. Thus, the user can enjoy the benefit of multiple commands and settings, even though the device according to the invention is small in size with a small number of buttons and can fit into a pocket.

In one embodiment, the device 20 of the mobile phone or tablet type has one of the following three operating systems: Android, iOS or Windows Phone (registered trademarks). The means 13 of said picture taking device 10 according to the present invention for using the screen 21 of said device 20 of mobile phone or tablet type have the ability to operate with the three abovementioned mobile phone or tablet operating systems.

Figure 3:
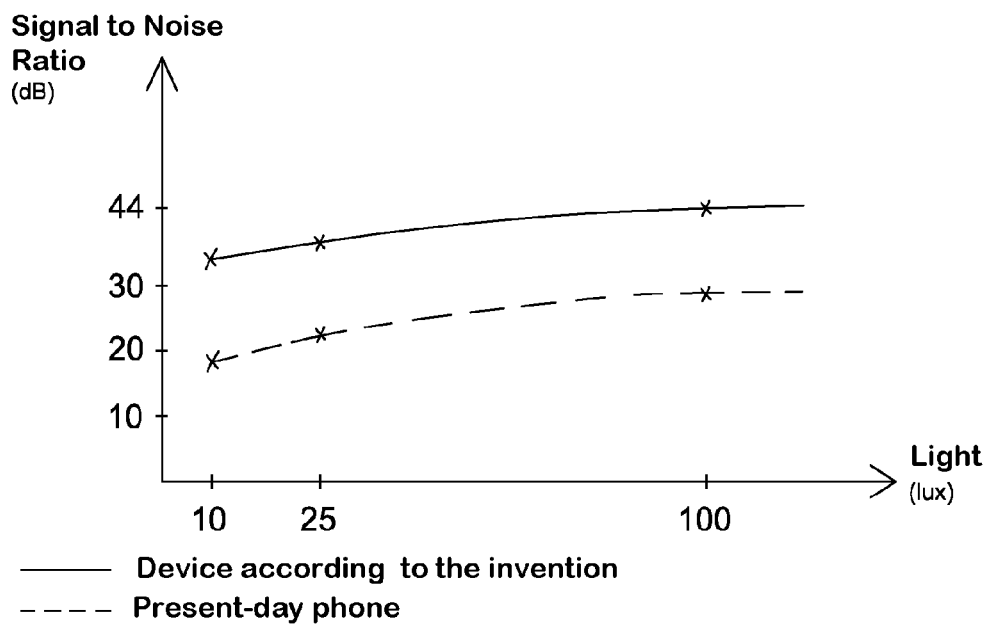
FIG. 3 is a graph illustrating the signal to noise ratio midway through the dynamic range as a function of light for the picture taking device according to the present invention and for current mobile phones.

FIG. 3 is a graph illustrating the signal to noise ratio as a function of light for the picture taking device according to the present invention and for present-day mobile phones or tablets for $1/30$ second exposure times.

The picture taking device 10 according to the present invention has a high image quality under low lighting conditions, and notably a reduced noise level when measured on a visible image exposed in such a way as to have elements of which the reflectance is 18% in the scene that is to be captured that reach the midway point of the dynamic range:
- for a 100 lux scene, the signal to noise ratio (SNR) midway through the dynamic range is of the order of 44 dB for the picture taking device 10 according to the present invention, and is of the order of 29 dB for present-day phones or tablets;
- for a 25 lux scene, the signal to noise ratio is of the order of 38 dB for the picture taking device 10 according to the present invention, and is of the order of 23 dB for present-day phones or tablets; and
- for a 10 lux scene, the signal to noise ratio is of the order of 34 dB for the picture taking device 10 according to the present invention, and is of the order of 19 dB for present-day phones or tablets.

The gain of 15 dB between the device and a present-day phone or tablet can be broken down as follows:
- the sensor is more sensitive: present-day phones or tablets use sensors of which the diagonal of the photosensitive surface measures less than 7 mm; the picture taking device 10 uses a sensor of which the diagonal of the photosensitive surface measures greater than 15 mm. For the same number of pixels across the sensors, that represents a gain of the order of 9 dB.
- digital processing for reducing noise while preserving the texture involving the temporal merger of four images. The gain is 2 stops, namely 6 dB.

In one embodiment, the objective lens comprises a diaphragm that allows the aperture of the objective lens, and, therefore, the depth of field, to be controlled when there is sufficient light.

Figure 4:
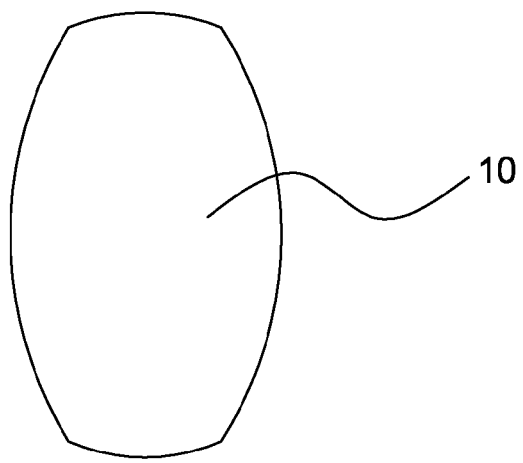
FIG. 4 illustrates the picture taking device according to the present invention in an embodiment in the form of a pebble.

FIG. 4 illustrates the picture taking device according to the present invention in an embodiment in which it takes the form of a pebble. This shape slips easily into a pocket.

Figure 5:
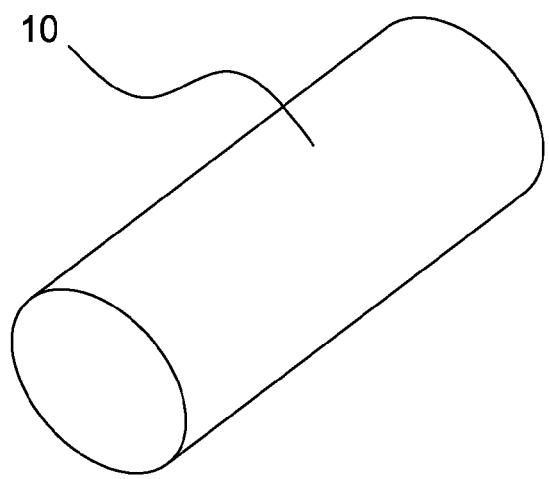
FIG. 5 depicts the picture taking device according to the present invention in an embodiment in the form of a cylinder.
Figure 6:
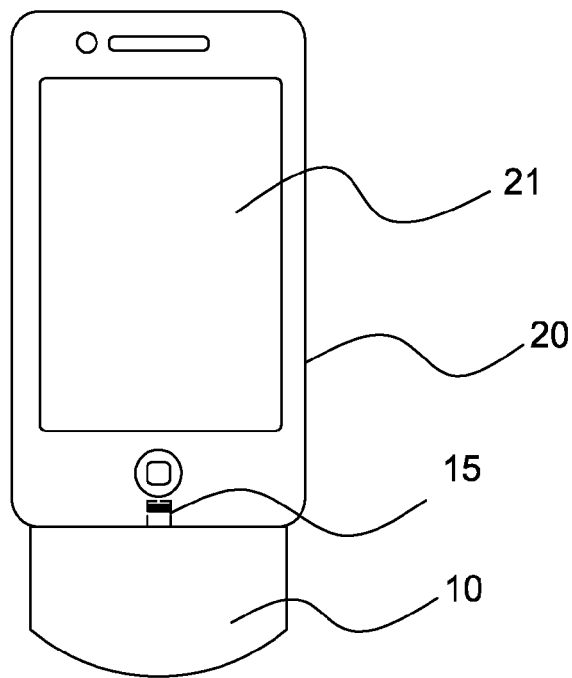
FIG. 6 depicts the picture taking device according to the present invention in an embodiment connected to a device of the IPHONE® type (registered trademark of Apple Inc.) via a connector of the "lightning" type.

FIG. 5 depicts the picture taking device according to the present invention in an embodiment in the form of a cylinder. This shape slips easily into a pocket FIG. 6 depicts the picture taking device according to the present invention in an embodiment connected to an iPhone (registered trademark of the company Apple) device via a lightning type connector. The lightning type connector is thus used in addition to its usual communications function as a rigid connector allowing the phone or tablet and the device according to the invention to be mechanically fixed together to make it easier to hold and take pictures as described above.

Figure 7:
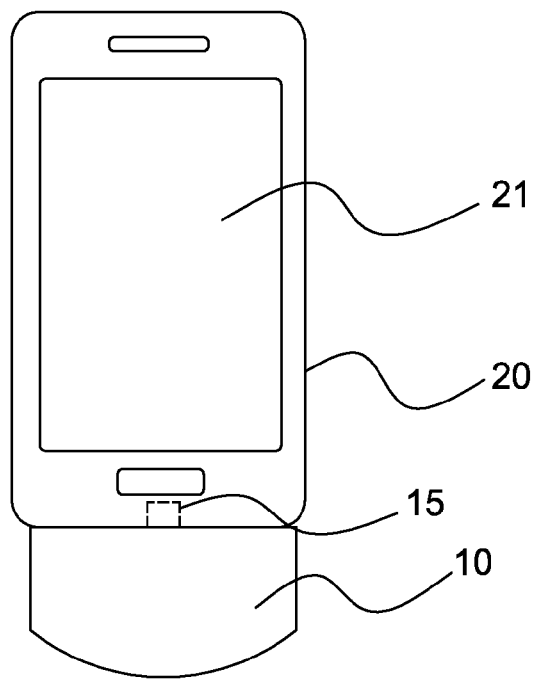
FIG. 7 illustrates the picture taking device according to the present invention in an embodiment connected to a mobile phone via a connector of the micro USB type.

FIG. 7 illustrates the picture taking device according to the present invention in an embodiment connected to a phone or to a tablet operating under the Android operating system via a micro USB type connector. The micro USB connector is thus used in addition to its usual communication function as a rigid connector allowing the phone or the tablet and the device according to the invention to be mechanically fixed together to make it easier to hold and take pictures as described above.

Figure 8:
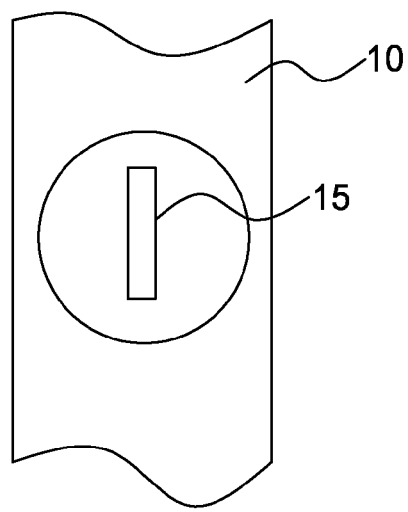
FIG. 8 depicts the connector of the picture taking device according to the present invention in a hinge system.

FIG. 8 depicts the connector of the picture taking device according to the present invention in a hinge system. Thus, the user can enjoy the benefit of an orientable screen making it possible for example to take pictures with his arms above the height of his face and aiming horizontally, even though the device according to the invention is small in size and can fit into a pocket.

Figure 9A:
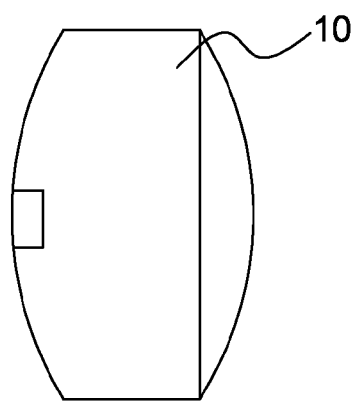
FIG. 9A depicts the picture taking device according to the present invention in an embodiment in the form of a closed pebble.

FIG. 9A depicts the picture taking device according to the present invention in an embodiment in which it has the shape of a closed pebble. This shape slips easily into a pocket with the connector protected.

Figure 9B:
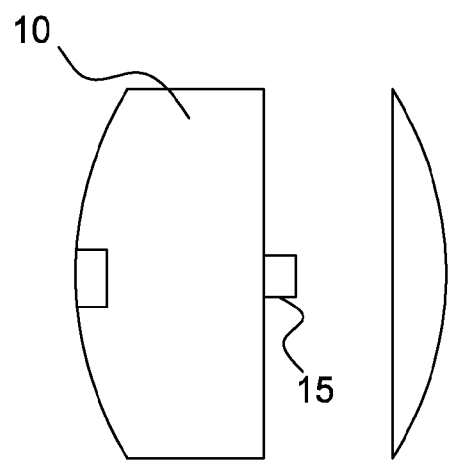
FIG. 9B depicts the picture taking device according to the present invention in an embodiment in the form of an open pebble.

FIG. 9B depicts the picture taking device according to the present invention in an embodiment in the form of an open pebble. This shape allows access to the connector for inserting it into the device 20 of the mobile phone or tablet type.

Figure 10A:
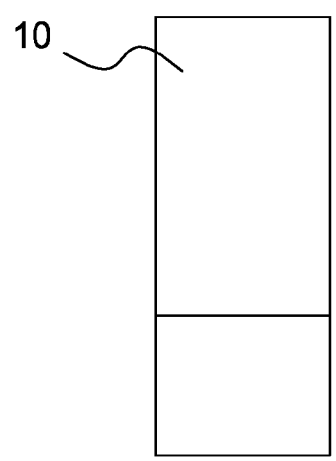
FIG. 10A illustrates the picture taking device according to the present invention in an embodiment in the form of a closed cylinder.

FIG. 10A illustrates the picture taking device according to the present invention in an embodiment in the form of a closed cylinder. This form slips easily into a pocket, with the connector protected.

Figure 10B:
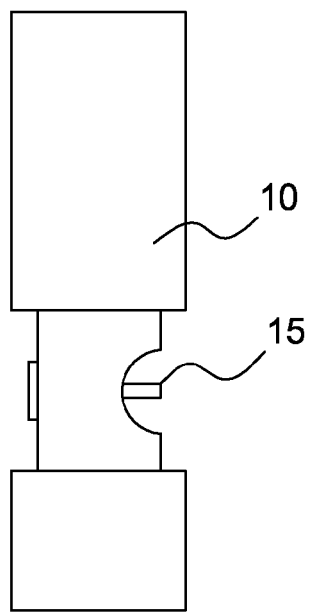
FIG. 10B illustrates the picture taking device according to the present invention in an embodiment in the form of an open cylinder.

FIG. 10B illustrates the picture taking device according to the present invention in an embodiment in the form of an open cylinder. This shape allows access to the connector for inserting it into the device 20 of mobile phone or tablet type.

Figure 11:
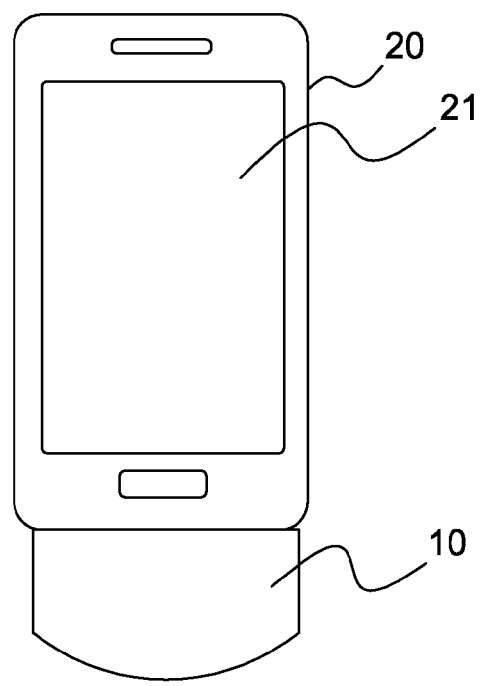
FIG. 11 depicts the picture taking device according to the present invention connected to a device of the mobile phone type, in one embodiment.

FIG. 11 depicts the picture taking device according to the present invention connected to a device of mobile phone or tablet type, in one embodiment. The device is thus easy to hold in the hands and allows pictures to be taken holding the assembly formed by the device according to the invention and the mobile phone or tablet firmly in order to reduce movement blur.

FIG. 12 depicts an exploded view of one embodiment of the picture taking device according to the present invention comprising an objective lens, a sensor in a camera module measuring 25×25×25 mm, a printed circuit containing the digital processing, a battery and a connector.

Figure 14A:
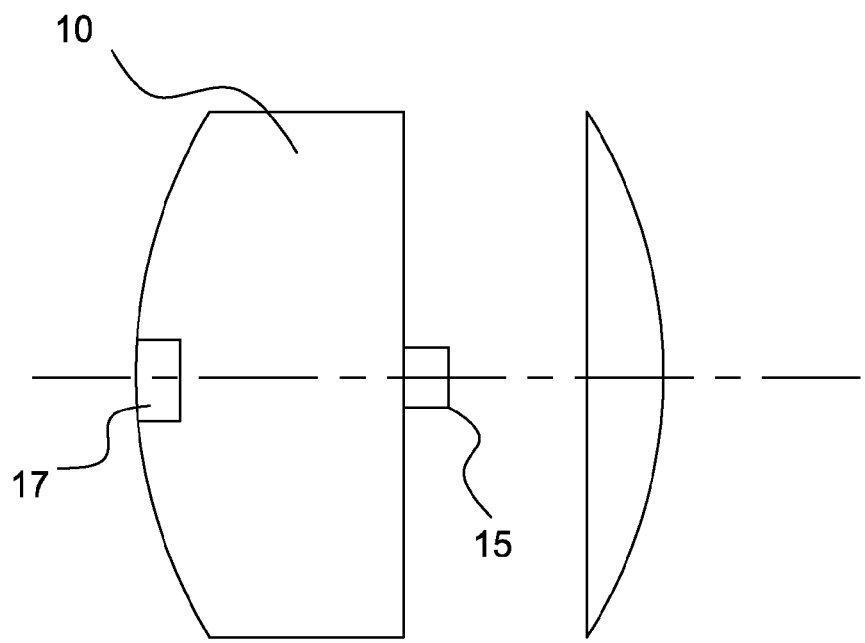
FIGS. 14A and 14B illustrate, according to one embodiment, the fact that the axis along which the button to start recording is pressed is situated in the plane containing the axis of the rigid connector and the points of the device that are used for holding same.
Figure 14B:
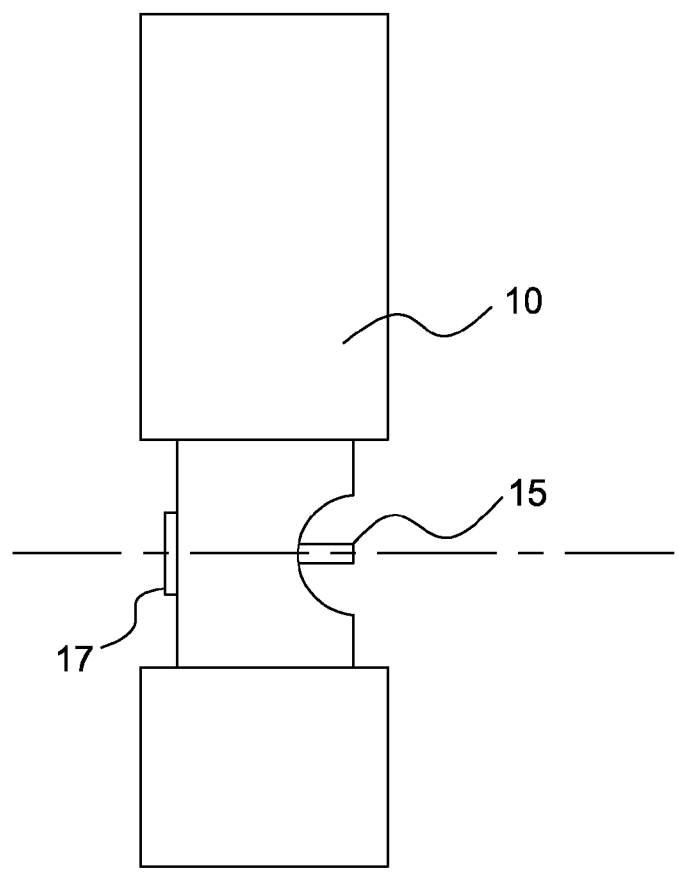

FIG. 14A and FIG. 14B illustrate, according to one embodiment, the fact that the axis along which the button for starting the recording 16 is pressed is situated in the plane containing the axis of the rigid connector 15 and the points of the device 10 which are used for holding it. The device is therefore easy to hold in the hand and allows pictures to be taken holding the assembly formed by the device according to the invention and the mobile phone or tablet firmly in order to reduce movement blur.

Figure 15:
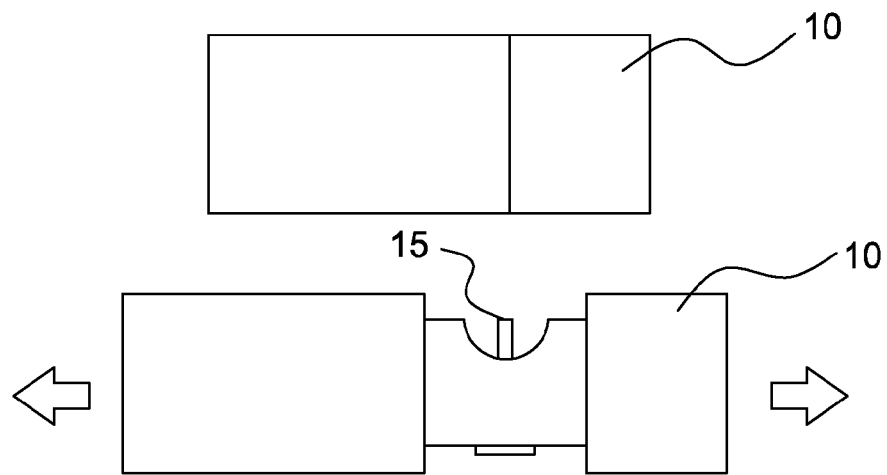
FIG. 15 illustrates an embodiment in which the device is in two parts which slide one on the other thus generating two positions, an open position and a closed position.

FIG. 15 illustrates an embodiment in which the device is in two parts which slide one on the other thus generating two positions, an open position and a closed position. Said closed position allows the connector 15 and the start button 16 to be protected. Said open position allows access to the connector 15 and to the start button 16. Said closed position makes it possible to fall inside the dimension conditions specified earlier.

Figure 16:
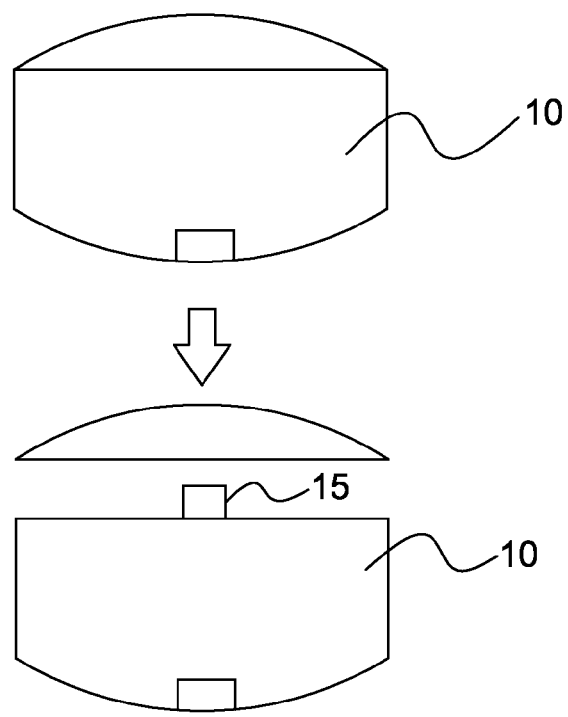
FIG. 16 illustrates an embodiment in which the device is provided with a removable cap to protect the connector.

FIG. 16 illustrates one embodiment in which the device is provided with a removable cap to protect the connector 15.

Figure 17:
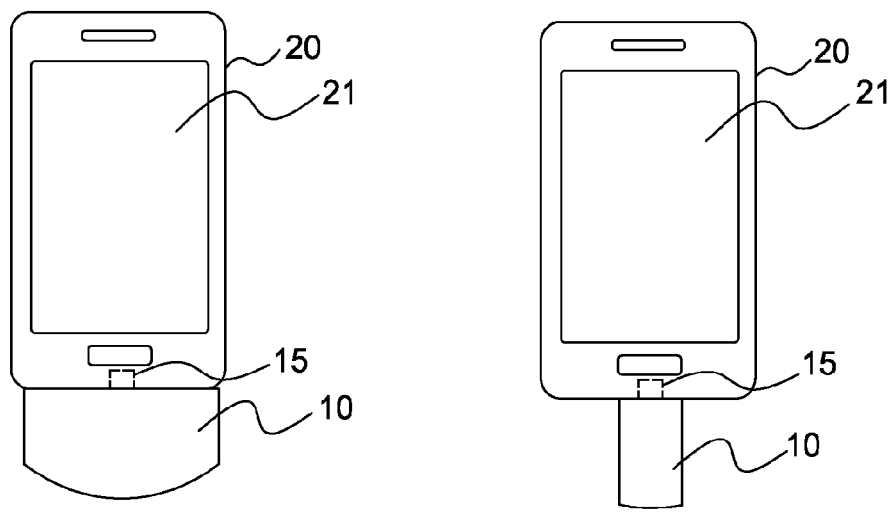
FIG. 17 illustrates an embodiment in which the rigid connector is positioned in a hinge within the picture taking device according to the present invention.

FIG. 17 illustrates an embodiment in which the rigid connector is positioned in a hinge within the device 10. This hinge allows device 10 to pivot about the connector and to change the orientation of the device 10 with respect to the device 20 of mobile phone or tablet type. Thus the user can enjoy the benefit of an orientable screen making it possible for example to take pictures with his arms above the height of his face and aiming horizontally, even though the device according to the invention is small in size and can fit into a pocket.

In one embodiment, the device 10 according to the present invention comprises means for producing a visible image of at least thirteen megapixels exposed in such a way as to have elements of which the reflectance is 18% in the scene to be captured which reach the middle of the dynamic range in the visible image with an SNR in the middle of the dynamic range of 34 dB or higher, SFR edge and SFR texture values which differ by less than 10% and which, at a quarter of the Nyquist frequency, are less than or equal to 120% and which, at half the Nyquist frequency, are greater than or equal to 50%, from the capturing of images at ⅟30 s or less of a scene illuminated at less than 10 lux. In this embodiment, said device 10 comprises an objective lens open to f/2.0 having an MTF at half the Nyquist frequency of more than 50%, a sensor the diagonal of the photosensitive surface of which measures 15.8 mm, for example the Aptina AR1411HS sensor, having no flash. It has a battery to power it, it being possible for example for the battery to be recharged depending on the embodiment using an external connector and/or by induction and/or by being removed from the device and/or via the phone or via the tablet. The digital processing means that reduce the noise while preserving the textures are made up of a denoising algorithm as described in K. Dabov, A. Foi, V. Katkovnik and K. Egiazarian (2009), "*BM3D image denoising with shape-adaptive principal component analysis*". In Proc. Workshop on Signal Processing With Adaptive Sparse Structured Representations: SPARS 09, volume 49 and a temporal merger performed on four images recorded consecutively by the sensor. Thus, the device according to the invention allows pictures to be taken in low lighting conditions while at the same time being small in size and fitting into a pocket.

Advantageously, in this embodiment, the device 10 uses these means to record a high-resolution (HD 1080p video format or better) video with a refresh rate greater than or equal to 30 images per second for a scene illuminated with 10 lux or less, each frame of which video is exposed in such a way as to have elements of which the reflectance is 18% in the scene that is to be recorded that reach the midway point of the dynamic range in the video recording, with an SNR in the middle of the dynamic range that is equal to or better than 34 dB, SFR edge and SFR texture values which differ by less than 10% and which, at a quarter of the Nyquist frequency, are less than or equal to 120% and which, at half the Nyquist frequency, are greater than or equal to 50%.

In one embodiment, said picture taking device 10 has no screen for previewing or post-viewing an image. That makes it possible to reduce the size of the device.

In one embodiment, said picture taking device 10 comprises image processing means that allow digital image stabilization. This makes it possible to reduce the size of the device by dispensing with the need for a bulky optical stabilization device while at the same time improving the picture taking performance under low lighting conditions and allowing a better temporal merger and thus noise reduction with better texture preservation performance.

In one embodiment, said picture taking device employs an autofocus function to maximize the sharpness of the subject being photographed and/or filmed. The autofocus function comprises a physical part that performs the operation of actually changing the focus and a system that analyses the quality of the focusing and that controls the physical part in order to optimize the focusing. The system that analyses and controls the optimizing of the focusing may for example be the one described in US2006/0164934A1. Greenleaf, Allen R., Photographic Optics, The MacMillan Company, New York, 1950, pp. 25-27 provides formulae for calculating the distance Dp to the first plane of sharpness and the distance Dd to the last plane of sharpness for a given optical system and the optimal focusing distance:

$$Dp = \frac{s(H-f)}{H+s-2f}$$

$$Dd = \frac{s(H-f)}{H-s}$$

where $$H = \frac{f^2}{Nc} + f$$

f is the focal length of the objective lens.
s is the distance at which the optical system is focused.
N is the aperture of the optical system.
c is the diameter of the confusion circle.

The depth of field Pc is the distance between the first plane of sharpness and the last plane of sharpness:

$$Pc = \frac{2s(H-f)(s-f)}{(H+s-2f)(H-s)}$$

In the context of the invention, the focal length will be greater than 10 mm, the aperture f/2.0 or more, c less than or equal to 5.6 μm.

For an s value of 1 m, Dp equals 0.9 m, Dd equals 1.12 m and Pc equals 0.22 m. In order to photograph or film subjects at other distances, a change in focus is needed. This focusing is performed by the autofocus function.

In one embodiment, said autofocus function operates continuously so as to keep the subject of interest permanently in focus. This makes it possible to use an objective lens open to an aperture of more than f/2.0 (with limited depth of field) thus improving performance under low lighting conditions.

The invention is described in the foregoing by way of example. It must be understood that a person skilled in the art is capable of embodying the invention in various different ways without thereby departing from the scope of the patent.

The invention claimed is:

1. A picture taking device comprising:
    a sensor of resolution higher than thirteen megapixels, a diagonal dimension of a photosensitive surface of the sensor being greater than 15 mm;
    an objective lens opening at minimum to f/2.0 for at least one focal length value;
    a digital processor to reduce noise in at least one image captured by the sensor;
    a rigid connector to connect the picture taking to device to a mobile phone or tablet type device comprising a screen;
    a power supply;
    a communications connector to communicate at least one of images and commands with the mobile phone or tablet type device; and
    wherein the picture taking device has dimensions meeting the following criteria: maximum and minimum of a height, a width and a depth of a smallest rectangular parallelepiped inside which the picture taking device can be inscribed are less than 70 mm and less than 30 mm, respectively, and a volume of the picture taking device is less than 86,000 mm³.

2. The picture taking device as claimed in claim 1, wherein the digital processor autonomously or in combination with the mobile phone or tablet type device is configured to produce a visible image of at least thirteen megapixels, having an exposure configured to have elements of which a reflectance is 18% in a scene to be captured which reach the middle of a dynamic range in the visible image with a signal to noise ratio midway through the dynamic range equal to or greater than 34 dB, spatial frequency response edge and spatial frequency response texture values which differ by less than 10% and which, at one quarter of the Nyquist frequency, are less than or equal to 120% and which, at half the Nyquist frequency, are greater than or equal to 50%, from a capture of images for exposure times of 1/30 s or less of a scene illuminated with light at a lighting level less than or equal to 10 lux.

3. The picture taking device as claimed in claim 1 comprises no screen to allow the previewing or post-viewing of an image.

4. The picture taking device as claimed in claim 1, wherein the communications connector is configured to allow an image taken by the picture taking device to be previewed on the screen of the mobile phone or tablet type device.

5. The picture taking device as claimed in claim 1, wherein the communications connector is configured to allow the picture taking device to be controlled using the screen of the mobile phone or tablet type device.

6. The picture taking device as claimed in claim 1, wherein the communications connector is configured to allow parameters of the picture taking device to be set using the screen of the mobile phone or tablet type device.

7. The picture taking device as claimed in claim 1, wherein the digital processor is configured to reduce the noise while preserving textures by a temporal merger of N images, N being a natural integer greater than or equal to 2.

8. The picture taking device as claimed in claim 1, wherein the digital processor configured to reduce the noise while preserving textures is hosted remotely on the mobile phone or tablet type device.

9. The picture taking device as claimed in claim 1, further comprising a recorder to record raw images in addition to or in place of a recording of visible images after digital processing operations have been performed.

10. The picture taking device as claimed in claim 1, wherein the rigid connector is positioned in a hinge allowing its orientation relative to the picture taking device to change.

11. The picture taking device as claimed in claim 1, further comprising an image processor to provide a digital image stabilization.

12. The picture taking device as claimed in claim 1, wherein the rigid connector is protected by a removable cap.

13. The picture taking device as claimed in claim 1, further comprising a transmitter to transmit at least one raw image to the mobile phone or tablet type device in at least one mode of operation.

14. The picture taking device as claimed in claim 1, further comprising an autofocus element to maximize a sharpness of a subject being photographed or filmed.

15. The picture taking device as claimed in claim 14, wherein the autofocus element operates continuously to keep the subject permanently in focus.

16. The picture taking device as claimed in claim 1, further comprising a button to start a recording.

17. The picture taking device as claimed in claim 16, wherein an axis along which the button to start the recording is pressed is situated in a plane containing an axis of the rigid connector and points of the picture taking device that are used for holding same.

18. The picture taking device as claimed in claim 16 is made up of two parts sliding one on the other so as to obtain an open position and a closed position, the closed position allows at least one of the rigid connector and the button to start the recording to be protected, and the open position allows access to at least one of the rigid connector and the button to start the recording.

19. The picture taking device as claimed in claim 16, wherein the button to start the recording has two modes of operation: partially depressed and fully depressed.

20. A picture taking method, comprising the steps of:
capturing, at $\frac{1}{30}$ s or lower, a scene comprising lighting of 10 lux or below using a picture taking device comprising:
 a sensor of resolution higher than thirteen megapixels, a diagonal dimension of a photosensitive surface of the sensor being greater than 15 mm;
 an objective lens opening at minimum to f/2.0 for at least one focal length value;
 a digital processor to reduce noise in at least one image captured by the sensor;
 a rigid connector to connect the picture taking to device to a mobile phone or tablet type device comprising a screen;
 a power supply;
 a communications connector to communicate at least one of images and commands with the mobile phone or tablet type device; and
 wherein the picture taking device has dimensions meeting the following criteria: maximum and minimum of a height, a width and a depth of a smallest rectangular parallelepiped inside which the picture taking device can be inscribed are less than 70 mm and less than 30 mm, respectively, and a volume of the picture taking device is less than 86,000 mm$^3$; and
producing a visible image of a quality higher than thirteen megapixels, the image having an exposure configured to have elements of which the reflectance is 18% in the scene that is to be captured which reach the middle of the dynamic range, with a signal to noise ration midway through the dynamic range of 34 dB or higher, a spatial frequency response edge and spatial frequency response texture values which differ by less than 10% and which, at a quarter of the Nyquist frequency, are less than or equal to 120% and which, at half the Nyquist frequency, are greater than or equal to 50%.

\* \* \* \* \*